United States Patent
Bogner et al.

(10) Patent No.: US 6,836,672 B2
(45) Date of Patent: Dec. 28, 2004

(54) DIVIDER CIRCUITRY

(75) Inventors: Norbert Bogner, Bavaria (DE); Albrecht Schuh, Bayern (DE)

(73) Assignee: Lucent Technologies Inc., Murray Hill, NJ (US)

( * ) Notice: Subject to any disclaimer, the term of this patent is extended or adjusted under 35 U.S.C. 154(b) by 454 days.

(21) Appl. No.: 10/109,399

(22) Filed: Mar. 28, 2002

(65) Prior Publication Data

US 2002/0151333 A1 Oct. 17, 2002

(30) Foreign Application Priority Data

Apr. 11, 2001 (EP) .............................................. 01303395

(51) Int. Cl.[7] .......................... H04B 1/38; H04B 1/02; H04B 1/04; H04M 1/00; H03C 7/02
(52) U.S. Cl. ..................... 455/561; 455/562.1; 455/101; 455/103; 455/132; 455/272; 455/273
(58) Field of Search .............................. 455/561, 562.1, 455/78, 83, 101, 103, 132, 269, 272, 273, 277.1, 280, 287; 333/100, 101, 109

(56) References Cited

U.S. PATENT DOCUMENTS

| | | | | |
|---|---|---|---|---|
| 4,774,481 A | * | 9/1988 | Edwards et al. ............. | 333/127 |
| 5,175,878 A | * | 12/1992 | Davis et al. ................. | 455/103 |
| 5,313,174 A | * | 5/1994 | Edwards ...................... | 333/109 |
| 5,701,596 A | * | 12/1997 | Meredith et al. ........... | 455/103 |
| 5,854,986 A | * | 12/1998 | Dorren et al. ............ | 455/562.1 |
| 6,021,166 A | * | 2/2000 | Suzuki ........................ | 375/347 |

FOREIGN PATENT DOCUMENTS

| | | | |
|---|---|---|---|
| EP | 0 439 939 | 8/1991 | ............ H01Q/3/24 |
| WO | WO 96 09733 | 3/1996 | ............ H04Q/7/30 |

* cited by examiner

*Primary Examiner*—Vivian Chin
*Assistant Examiner*—Raymond B. Persino

(57) ABSTRACT

A base station in a communication network which has a number of receiver or transmitter circuits (TRX) and a number of splitters (SP1, . . . SP6) is provided with switchable divider circuitry, if the number of receiver or transmitter circuits (TRX) is other than $2^n$ (n=2, 3, 4, . . . ). The divider circuit has at least an input, preferably two inputs (IN-A, IN-B), an attenuation member, preferably two members (AT1, AT2) and a divider element (DE), preferable three elements (DE1, DE2, DE3) and is connected parallel to a respective splitter (SP) so as to offer further splitter outputs for being connected to the inputs of remaining receivers or transmitter circuits (TRX) other than $2^n$.

8 Claims, 2 Drawing Sheets

DIVIDER CIRCUITRY

CROSS REFERENCE TO RELATED APPLICATION

This application claims priority of European Application No. 01303395.6 filed on Apr. 11, 2001.

FIELD OF THE INVENTION

The present invention relates generally to a base station in a communication network and particularly to a divider circuitry in the receiving path of a radio communication apparatus which comprises divider units and respective receiver circuits.

BACKGROUND OF THE INVENTION

In global systems for mobile communication, base stations are provided having one or a plurality of antennas which receive radio signals on a channel and amplify same to supply the signal to divider units and the receiving circuitry of the base station. To that purpose, the received and preamplified signal has to be split up by the divider units n sub-channels onto a plurality of outputs. The number of the divider units and the outputs thereof is oriented on the maximum number of transmitter-receiver-units (transceiver units) of a base station which has to service its cell. There are different configurations of cells, for example omnidirectional cells and sectoral cells, and also the grouping of the transceivers within a base station may be different among base stations. Mostly, the divider units are positioned so as the connections to the transceivers are short and simple.

Base stations usually comprise a main receiver branch and a so-called diversity receiver branch. The above-described scheme of signal splitting is commonly used for both branches. The divider units multiply the signal into several paths so that one input is connected to a plurality of outputs. This is made by the help of passive or active divider circuits, for example transformers, or by using divider circuits in cascades. Each step of division means a division in power or attenuation in the signal paths corresponding to the number of outputs.

A base station may comprise 12 transceivers for servicing the cell to which it is assigned wherein the cell may comprise for example three sectors. This means four transceivers and four divider units per receiving path. If there is diversity, eight divider units are necessary for servicing the main and the diversity branch. Often, a network owner or carrier wishes to use a cell configuration having six transceivers per sector. This means that two of the divider units have outputs which are not used and mean costs for a hardware and space in the base station without having utility thereof.

SUMMARY OF THE INVENTION

It is an object of the present invention to reduce the hardware costs in base stations wherein the number of transceivers is different to $2^n (n=2, 3, 4)$. In such cases, the costs for the divider units and the necessary space for these divider units is to be reduced.

In a preferred embodiment, a special switchable, divider unit is provided which comprises two signal inputs and three divider elements. Each divider element has an input and a pair of outputs. Switching means may take a first and a second positions. In the first position, the first signal input is divided into four output signals along the divider elements which are connected in cascade. In the second position of the switching means, the first divider in the cascade is bypassed, that is, the first signal input is connected to the input of the second divider element, and the second signal input is connected to the input of the third divider element. By doing so, one signal input can be assigned to four signal outputs, or two signal inputs can be assigned to each a pair of outputs.

It may be desirable to have the same alternation characteristic for every output in the first and the second positions of the switching means. To that end, when bypassing the first divider element, each an attenuating member is inserted between signal input and input of the second and the third divider elements, respectively. The attenuating member should have the same characteristic as the first divider element which it bypasses. By these means, the alternation characteristic in the receiving path is the same for all variations of configuration.

The divider units can be arranged directly adjacent to transmitting devices or transceivers so that the length of connecting cables between the divider units and the transceivers can be kept low and can have a simple structure.

DESCRIPTION OF THE EMBODIMENTS

Figure 1:
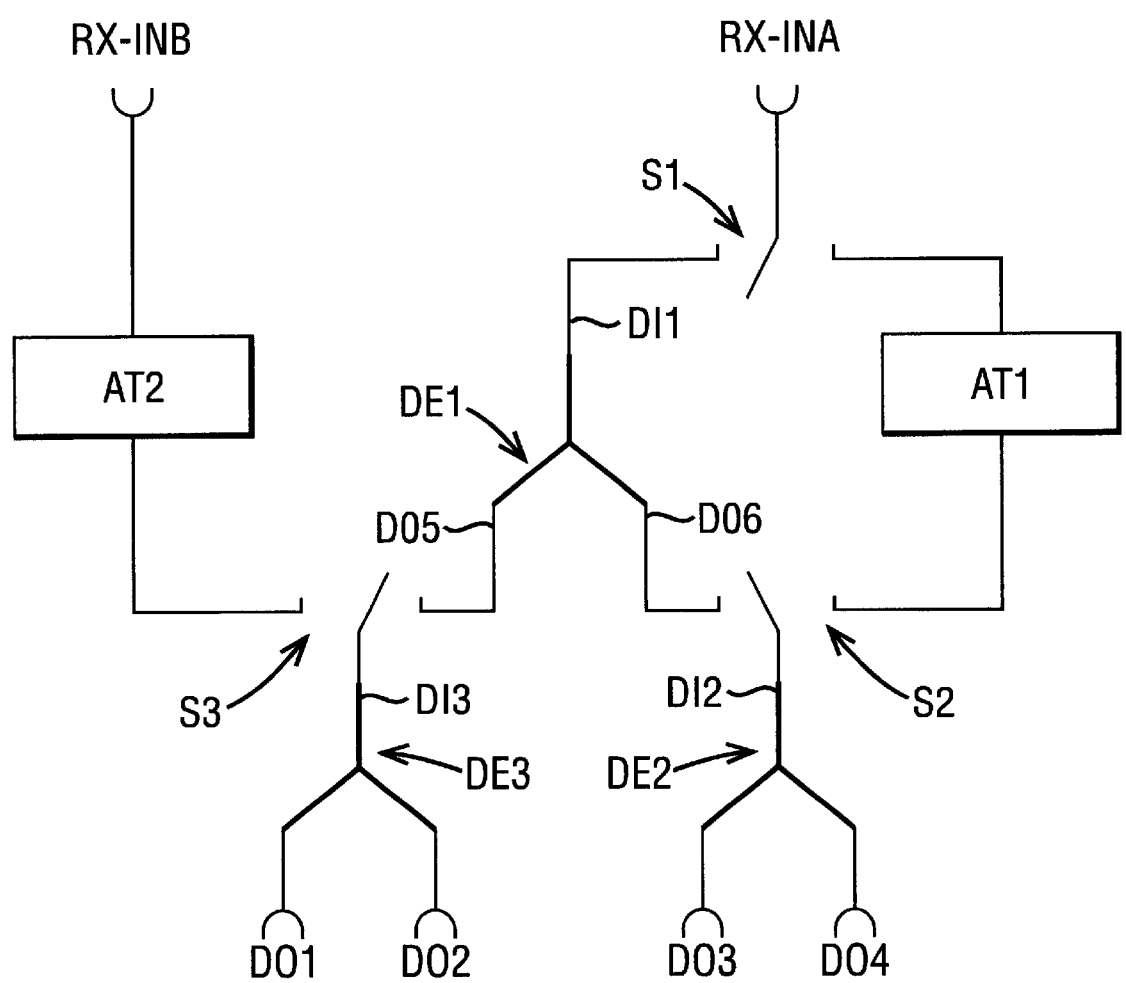
FIG. 1 is a block diagram of a divider unit.

Referring to FIG. 1, three divider elements DE1, DE2 and DE3 are connected in cascade. Divider element DE1 has an input DI1 and a pair of outputs DO5 and DO6. Similarly, divider element DE2 has an input DI2 and outputs DO3 and DO4. The divider element DE3 has an input DI3 and outputs DO1 and DO2. Furthermore, there is a first signal input RX-IN A and a second signal input RX-IN B, and switching means S1, S2, S3 for connecting these signal inputs to divider elements. In the first position of the switching means S1, S2, S3, signal input RX-IN A is connected to the input DI1 of divider element DE1, output DO5 of DE1 is connected through switch S3 to input DI3 of divider element DE3 and output DO6 of divider element DE1 is connected through switch S2 to input DI2 of divider element DE2. In the second position of the switching means S1, S2, S3, the first signal input RX-IN A is connected through switch S1, a bypass line including the first attenuation member AT1 to switch S2 and divider element DE2. Second signal input RX-IN B is connected through a second bypass line and a second attenuation member AT2 to switch S3 and the input of divider element DE3.

In the first position of the switching means S1, S2, S3 one signal input RX-IN A is assigned to four outputs. In the second position of the switching means, two signal inputs are assigned to each a pair of outputs.

The divider elements DE1, DE2, DE3 can be implemented with passive or active members. The switching means can be implemented by mechanical switches, electromagnetic switches or electronic switches, such as pin diodes. The attenuation members AT1 and AT2 are used to correct attenuation in the respective signal paths to the outputs DO1, DO2, DO3, DO4 so that attenuation is the same for all signal paths, irrespective of the position of the switching means.

The circuit shown in FIG. 1 can be modified, for example doubled. This allows to assign two signal inputs to four outputs each, or in the second position of the switching means, four signal inputs to each a pair of outputs. Furthermore, the combinations 1×4 as well as 2×2 are still possible.

Figure 2:
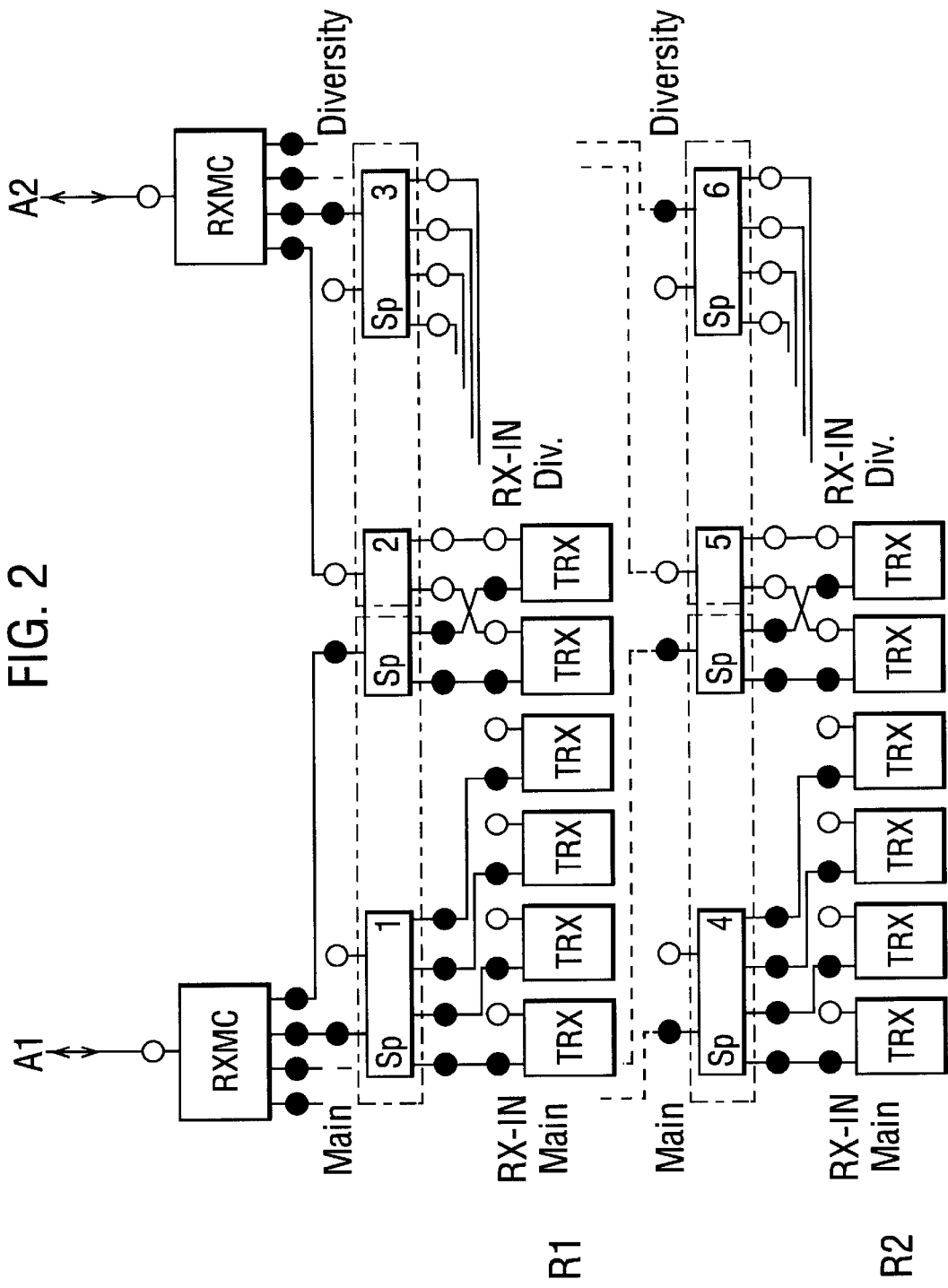
FIG. 2 is a divider circuitry in a base station.

FIG. 2 shows the receiver circuitry of a radio communication apparatus wherein divider circuitry according to invention is incorporated. A pair of antennas A1, A2 are connected to each a multicarrier receiver RXMC in a main branch and a diversity branch. The receivers usually comprise low noise preamplifiers and have a number of outputs, here four outputs. Each output is connected to a splitter SP1, SP2, SP3, SP4, SP5, and SP6. Each splitter has four outputs which are connected to a respective transceiver TRX, in the present case twelve transceivers are provided in two rows R1, R2. Splitters are made up of dividers of the kind shown in FIG. 1, however, also conventional splitters may be used for splitters SP1, SP3, SP4 and SP6. Each output of the splitters SP1 and SP3 is connected to a respective input RXIN for the main and the diversity branches, that is, four transceivers TRX in the row R1 are occupied. Two transceivers TRX remain in the upper row R1 of transceivers. Splitter SP2 is a divider unit as shown in FIG. 1, that is, it has two inputs and four outputs. The switching means S1, S2, S3 are in the second position so that the first input of the splitter SP2 is connected to one of the outputs of receiver RXMC oft he main branch. The second input of the splitter SP2 is connected to the receiver RXMC of the diversity branch. The outputs of the splitter SP2 are connected to the inputs of the two remaining transceivers in the row R1.

All four outputs of splitter SP2 therefore are used. If splitter SP2 were a conventional one, it had only one input and therefore could be addressed only from one receiver RX-MC. This means that instead of splitter SP2 a pair of splitters had to be used in the conventional technology, and each of these splitters had two outputs unused.

The receivers RX-MC of the main and the diversity branches are also connected to splitters SP4, SP5, and SP6 in the same manner as described with splitters SP1, SP2, SP3. The second row R2 of transceivers TRX includes six transceivers wherein four transceivers are connected to splitters SP4 and SP6 whereas the remaining two transceivers are connected to splitter SP5 which has its inputs connected to the receivers RXMC of the main branch and the diversity branch, respectively.

The transceivers TRX may include coupling and filtering units. It is preferred to unify or integrate the divider circuit with such coupling and filtering units, that is, the RX outputs are directly connected to the TRX inputs. This reduces the hardware costs in terms of housing, latchings, legend as well as developing and producing costs and logistic costs, since one unit less need to be ordered.

It is also possible to arrange the splitters horizontally above and below of a carrier member wherein the TRX units are accommodated. Such arrangement shows cabling which is very short between the divider units and the transceivers belonging thereto.

If no diversity branch is provided, also a half divider of FIG. 1 can be used, that is RX-IN B is directly connected through AT2 to D13 of element DE3 and elements DE1, DE2 can be omitted, or RX-IN A, AT1 and DE2 form a half divider for being used in the base station which has no diversity branch.

What is claimed is:

1. A base station in a communication network comprising a number of receiver or transmitter circuits each having at least one input, and a number of splitters, each having at least an input and four outputs, at least one input being connected to a radio signal channel and each output carrying a sub-channel being connected to an input of a respective receiver or transmitter circuit, wherein when the number of receiver or transmitter circuits is other than $2^n$ (n=2, 3, 4, . . . ), a divider circuit having an input, an attenuation member and a divider element, is connected in addition to a respective splitter so as to offer further splitter outputs for being connected to the inputs of remaining receivers or transmitter circuits other than $2^n$.

2. A divider circuitry for a base station of a radio communication network set forth in claim 1 wherein at least a switchable divider unit is provided comprising at least a first and a second signal input, at least three divider elements, each having a divider input and at least a pair of divider outputs, and switching means which, in a first position, connect the first signal input to the divider input of the first divider element and the divider outputs thereof to the divider inputs of the at least second and third divider elements, and, in an at least second position, connect the first signal input to the divider input of the second divider element as well as the second signal input to the divider input of the third divider element.

3. The base station of claim 2 wherein each divider units is closely arranged to, or integrated in a respective coupling or filtering unit of a respective transmission path of the transmitter.

4. The base station of claim 2 wherein the divider units are arranged directly adjacent to transmitting units.

5. The divider circuitry of claim 2 wherein said switching means include bypass lines having alternation members, the switching means, in its second position, make the attenuating members effective, so as to simulate the attenuation of the first divider element.

6. The base station of claim 5 wherein a group of radio signals is developed from splitting up the receiving signal or signals from one or a plurality of antennas, and wherein the outputs of the switchable divider units, by actuating the switching means can be connected to one or a plurality of receivers.

7. The base station of claim 6 wherein said divider circuits are shielded electrically from one another.

8. The base station of claim 6 wherein the attenuation members are arranged in the switching paths of the switching means in such a way that in all positions, which the switching means may take, and therefore for all combinations of assigning outputs to inputs, each signal receiving path to the respective receiver has the same attenuation.

* * * * *